United States Patent [19]
Dieckmann

[11] 3,919,168
[45] Nov. 11, 1975

[54] VINYL HALIDE RESIN STABILIZER COMPOSITIONS OF ORGANOTIN OR ANTIMONY ORGANIC SULFUR-CONTAINING COMPOUNDS AND TRI-ALKALI METAL PHOSPHATES

[75] Inventor: Dale J. Dieckmann, Euclid, Ohio

[73] Assignee: Dart Industries Inc., Los Angeles, Calif.

[22] Filed: Apr. 19, 1974

[21] Appl. No.: 462,360

[52] U.S. Cl....... 260/45.75 S; 260/45.7 P; 252/406; 260/45.75 B
[51] Int. Cl.² ............................................. C08G 6/00
[58] Field of Search .. 260/45.75 B, 45.75 S, 45.7 P; 252/406

[56] References Cited
UNITED STATES PATENTS

| | | | |
|---|---|---|---|
| 2,218,645 | 10/1940 | Japs | 260/45.75 |
| 2,597,987 | 5/1952 | Harding | 260/45.75 |
| 2,684,956 | 7/1954 | Weinberg | 260/45.75 |
| 2,868,765 | 1/1949 | Haefner | 260/45.75 |
| 2,914,506 | 11/1969 | Mack | 260/45.75 |
| 3,340,285 | 9/1967 | Remes | 260/45.75 |
| 3,399,220 | 9/1968 | Brennmer | 260/45.75 |
| 3,466,261 | 9/1969 | Mauz | 260/45.75 |
| 3,655,703 | 4/1972 | Hock | 260/45.75 |

*Primary Examiner*—V. P. Hoke
*Attorney, Agent, or Firm*—Wood, Herron & Evans

[57] ABSTRACT

A vinyl halide resin stabilizer composition which essentially contains:
a. an antimony organic or organotin sulfur-containing compound, for example, antimony alkyl mercaptides, organotin mercaptides, antimony mercaptoacid esters, organotin mercaptoacids and esters, and the like, and
b. a tri-alkali metal phosphate, such as tri-sodium phosphate.

These compositions synergistically contribute to the long term heat stability of vinyl halide resin compositions and offer significant heat stabilization economies and improvements. Inhibition or minimization of early color development in vinyl halide resin compositions which are being worked or molded under the action of heat have also been achieved with the resin stabilizer compositions of this invention.

23 Claims, No Drawings

3,919,168

VINYL HALIDE RESIN STABILIZER COMPOSITIONS OF ORGANOTIN OR ANTIMONY ORGANIC SULFUR-CONTAINING COMPOUNDS AND TRI-ALKALI METAL PHOSPHATES

BACKGROUND OF THE INVENTION

It is well-known in the art that organotin sulfur-containing compounds such as the organotin mercaptides are among the most efficient (by weight) heat stabilizers for vinyl halide resins. Among the organotin sulfur-containing compounds which have been proposed for the stabilization of polyvinyl chloride resins are organotin mercaptides, organotin mercaptoacids as described in U.S. Pat. Nos. 2,641,588; 2,648,650; 2,726,227; 2,726,254; 2,801,258; 2,870,119; 2,891,922; 2,914,506; 2,954,363 and 3,646,081; the organotin mercaptoacid esters as described in U.S. Pat. No. 2,641,596; organotin esters of mercapto alcohols of U.S. Pat. Nos. 2,870,119; 2,870;182; 2,872,468 and 2,883,363; and organo thiostannoic acids such as butyl thiostannoic acid as disclosed in U.S. Pat. Nos. 3,021,302; 3,413,264; 3,424,712 and 3,424,717. However, there are certain factors which have limited the use of organotin sulfur-containing compounds. Chief among these factors are their high cost. Also, sulfur-containing radicals introduce an odor problem. Further, these compounds also tend to impart poor light stability and plasticize rigid polyvinyl chloride (PVC) compositions. Therefore, vinyl halide resin formulators have heretofore sought to overcome such deficiencies as exemplified by U.S. Pat. No. 3,764,571.

Antimony mercaptides have also been proposed as stabilizers for vinyl halide resins to guard against degradation by heat during molding and working of the resin into useful articles. Prior art patents which disclose such antimony organic sulfur-containing compounds and their utility as stabilizers include U.S. Pat. Nos. 2,680,726; 2,684,956; 3,340,285; 3,399,220; 3,446,261 and 3,530,158. In commercial practice, however, the antimony mercaptides have not been widely used as stabilizers because of various shortcomings including, for example, their propensity to exude from molded or worked PVC plastic stock, cost or lack of other advantages associated with their use which might outweigh such shortcomings. Therefore, antimony mercaptides and similar antimony organic compounds as stabilizers for vinyl halide resins have heretofore had limited utility in comparison to other organometalic stabilizers.

SUMMARY OF THE INVENTION

The present invention is directed to improvements in vinyl halide resin stabilizer systems. The principles of this invention apply to stabilizer compositions of both organotin sulfur-containing compounds and antimony organic sulfur-containing compounds. Each of these classes of compounds, though chemically distinct and separable in their stabilizing activities, have been found to possess synergistic heat stabilization activities in combination with tri-alkali metal phosphates.

More particularly, an organotin sulfur-containing compound or an antimony organic sulfur-containing compound together with a tri-alkali metal phosphate such as trisodium or tripotassium phosphate have been found to contribute long term heat stabilization to a vinyl halide resin. It has also been found that synergistic long term heat stabilizations are provided by these compositions, i.e., the sum of the stabilizing effects of an amount of each component alone upon the resin is exceeded when the same amounts of components are together in the resin composition. In another of its aspects, the tri-alkali metal phosphates in either hydrated, anhydrated or alkaline salt form synergistically function in the combination with the organotin or antimony organic components for long term heat stability. Improved early color has also been achieved in addition to the benefits of long term heat stabilization in accordance with the principles of this invention.

The heat stabilization activities of the stabilizer compositions of this invention are unexpected and advantageous for several reasons. These rather distinct classes of organometalic components have been found to possess unique heat stabilization activities with tri-alkali metal phosphates. These discoveries provide a broader field of utility for all compoments of the stabilizer compositions of this invention as well as for the vinyl halide resins and useful articles molded or worked therefrom. Improvements in stabilizing efficiency and cost reduction are also afforded by this invention; and other deficiencies in prior compositions as mentioned in the background above can hereby be overcome or minimized. While alkali metal phosphates alone and in the presence of other ingredients may have been suggested as heat stabilizers for vinyl halide resins as illustrated by U.S. Pat. Nos. 2,218,645 and 2,868,765, I have found that trisodium or tripotassium phosphate alone at use levels in the range of about 1 to 10 parts per hundred in vinyl halide resins at elevated working temperatures will not materially contribute to heat stabilization of the resin. Also, other seemingly chemically similar sodium phosphates such as disodium monohydrogen phosphate, sodium dihydrogen phosphate monohydrate, sodium hexametaphosphate, sodium pyrophosphate and pentasodium tripolyphosphate have not been found by me to provide synergistic heat stabilization effects with antimony organic or organotin sulfur-containing components. For instance, based upon my findings of synergisms and amounts of components where such synergisms might be found, these other seemingly chemically similar metal compounds do not display heat stabilizing synergisms with antimony organic or organotin sulfur-containing compounds. In unexpected contrast, however, trisodium phosphate and the antimony organic or organotin sulfur-containing components in combination provide highly unexpected results. Such unexpected results and other unexpected results along with other advantages are empirically demonstrated in numerous operating examples of this invention, and a further understanding thereof will become apparent in view of the detailed description herein. In the stabilizer compositions of organotin or antimony organic sulfur-containing compounds and tri-alkali metal phosphates of this invention, the benefits of stabilization can be realized over broad ranges of both total parts by weight of the stabilizer compositions in the vinyl halide resin and the weight ratios of each of the components with respect to the other. Particularly useful stabilizer compositions of this invention are achieved with a total parts by weight range on the order of about 0.2 to about 15 parts by weight based upon 100 parts by weight (phr) of the vinyl halide resins. A most useful range of total parts by weight of stabilizer composition is on the order of about 0.5 to about 10 phr and this depends upon the desired heat stability in a particular vinyl halide resin composition consistent with other requirements and economies. There are certain generally preferred weight ratios of the organometalic sulfur-containing compounds relative to the tri-alkali metal phosphates. This will become apparent in view of the detailed operating examples. However, it is to be emphasized that the most desirable weight ratios of each of the essential components of the composition of this invention for a particular application and resin system can be arrived at in accordance with the teachings of this invention. Thus, in its broader aspects, this invention is not limited to weight ratios of components. In general, the combination of tri-alkali metal phosphate with the organotin sulfur-containing compound is utilized at total parts on the order of about 0.2 to about 15 phr; and where the metal phosphate is within the range of about 0.1 to about 10 phr and the organotin compound is in the range of about 0.1 to about 5 phr. In general, the combination of tri-alkali metal phosphate with the antimony organic sulfur-containing compound is utilized at total parts on the order of about 0.2 to about 10 phr; and where the metal phosphate is within the range of about 0.1 to about 10 phr and the antimony compound is the range of about 0.1 to about 3 phr.

ORGANOTIN AND ANTIMONY ORGANIC SULFUR-CONTAINING COMPOUNDS

A. Organotin Sulfur-Containing Compound

The organotin sulfur-containing compounds which are of use in this invention are generally characterized as having a sulfur-containing radical or atom attached to the tin through the sulfur atom and a hydrocarbon or substituted hydrocarbon group directly attached to the tin through a carbon atom, i.e., compounds containing the

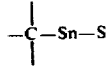

group. These compounds can also be characterized by the formula R-Sn-S wherein R represents a mono or polyvalent hydrocarbon or non-hydrocarbon substituted hydrocarbon radical. As mentioned, this combination of R-Sn-S bonds has been heretofore recognized as giving optimum stabilization to vinyl halide resins. The tin bonds are usually derived from polyvalent tin by having at least one valence for bonding to the sulfur atom while the remaining valence or valences are for bonding with a hydrocarbon radical. Tin usually acts as a bi- or tetra- valent atom, but coordination complexes of tin are known where the tin behaves in even a higher valence state and, therefore, the valence state of tin can vary in the organotin compounds which can be used in this invention.

Generally, however, most organotins suitable for use in this invention are derived from tetravalent tin. Of the types or organotin compounds contemplated, included are organotin mercaptides which may be characterized by the Formula I:

Formula I

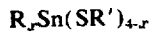

wherein R and R' represent hydrocarbon or substituted hydrocarbon radicals selected from the group consisting of alkyl, aryl, oxyalkyl, oxyaryl and the furfuryl and tetrahydrofurfuryl radicals, and x is an integral number from 1 to 3. Examples of such groups are alkyls such as methyl, ethyl, butyl, octyl, dodecyl and octadecyl; aryls such as phenyl, tolyl, naphthyl or xylyl; oxyalkyl and oxyaryl, such as propyloxide, butyloxide, octyloxide, benzyloxide; and the furfuryl and tetrahydrofurfuryl groups. Specific examples of organotin mercaptides in which R and R' are butyl, for example, and x varies from 1 to 3 are monobutyltin tributylmercaptide, dibutyltin dibutylmercaptide and tributyltin monobutylmercaptide. Patents exemplifying this formula $R_xSn(SR')_{4-x}$ or a similar formula and a definition of compounds represented thereby include U.S. Pat. Nos. 2,641,588; 2,641,596; 2,648,650; 2,726,254 and 2,789,963, among others.

While the simplest representatives of the organotin sulfur-containing compounds are the organotin mercaptides of the Formula I, $R_xSn(SR')_{4-x'}$ as stated herein above, the important components of the compounds are the organotin group and the tin-sulfur group. The organotins are therefore, not limited to the components of this formula, but are shown by all compounds in which a sulfur atom or mercapto radical is bound through the sulfur atom to the tin atom of the organotin radical, i.e., those organotins containing the R-Sn-S bonds. These compounds may be further defined by the Formula II:

Formula II 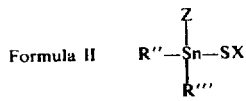

Where R'', R''', SX and Z have the following significance: R'' and R''' may be different monovalent hydrocarbon radicals or substituted hydrocarbon radicals, but will be generally the same radicals because the starting materials for the preparation of the organotin mercapto compounds will be generally the di- (or tri-)hydrocarbon tin halides or oxides available in commerce. The nature of these groups has in most cases no, or only a very minor, influence on the properties of the end products. R'' and R''' may be aliphatic, aromatic, or alicyclic groups such as methyl, ethyl, propyl, butyl, amyl, hexyl, octyl, lauryl, allyl, benzyl, phenyl, tolyl, naphtyl and cyclohexyl, or substituted hydrocarbon groups of these groups having -OH, -NH₂, -CN, etc., radicals in the molecule such as cyanoethyl (of the type described in U.S. Pat. No. 3,471,538) and the like.

The group SX of Formula II, for instance, may be sulfur alone, the rest of a mercaptan, or a dimercaptan, or a mercapto alcohol, or an ester of a mercapto alcohol or mercapto acid. The patents mentioned above in the background of the invention give examples of this. Aliphatic and aromatic mercaptans may be employed to form the group SX. In the case of aliphatic mercaptans, those having 8 to 18 carbon atoms, e.g., decyl or dodecyl mercaptan are usually preferred because the lower mercaptans are unsuitable for the preparation and use of the stabilizers on account of their offensive smell. Suitable aromatic mercaptans are, for instance, thionaphthol, thiobenzyl alcohol, phenoxyethyl mercaptan, phenoxyethoxyethyl mercaptan, and other. As examples of suitable mercapto alcohols, monothioethylene glycol, monothiopropylene glycol, thioglycerol, thiodiethylene glycol, and others may be mentioned. Particularly suitable are the esters of these mercapto alcohols in which the hydroxy groups are esterified by an aliphatic, aromatic, or alicyclic saturated or unsaturated monocarboxylic acid. Readily available mercaptoacid esters are the esters of thioglycolic acid, such as ethyl thioglycolate, isooctylthioglycolate, and generally the esters of mono and dibasic aliphatic and aromatic acid mercaptides, such as esters of beta mercaptopropionic acid, mercaptolactic acid, mercaptobutyric acid and mercaptolauric acid. It will be understood that the recited examples for group SX apply to SR' of Formula I and the examples of R'' and R''' apply to R or R' of Formula I.

The group Z of Formula II may be a monovalent hydrocarbon radical like R'' and R''', in which case the compound is a tri-hydrocarbon tin mercapto compound. The three hydrocarbon groups may have the same or different composition. Z may also be a sulfur alone or the rest of a mercapto compound linked through the S atom to the tin atom, in which case it may have the same composition as SX or a different composition. The former case represents a dihydrocarbon tin dimercapto compound and the latter case represents a mixed mercapto derivative of the dihydrocarbon stannanediol. Also polymeric tin mercaptides are defined where the rest of the mercapto compound is formed from a dimercapto compound and thus a hydrocarbon residue of a dimercaptan is a repeating unit linked through the S atom at each end to the tin atom as exemplified in U.S. Pat. No. 3,646,081. In another subgroup, Z may be the rest of an alcohol or of a carboxylic acid linked through the oxygen of the alcoholic hydroxyl group or of the carboxylic acid group to the tin atom. Such compounds can be defined as monoesters or monoethers of hydrocarbon substituted stannanediol, in which the second hydroxyl group of the stannanediol is replaced by a mercapto compound. Thio alcohols and acids which are capable of forming such ether and ester groups are illustrated in the patents cited in the background of this invention along with their methods of preparation. Other specific references to organotin sulfur-containing compounds as widely described in the patent art include U.S. Pat. No. 2,641,588, col. 1, lines 32–53 to col. 2, lines 13–46; U.S. Pat. No. 2,641,596, col. 1, lines 10–44; U.S. Pat. No. 2,726,254, col. 1 line 63 to col. 2, line 19; U.S. Pat. No. 2,789,963, col. 2, lines 35–60; U.S. Pat. No. 2,914,506, col. 1, lines 59 to col. 4, line 8; U.S. Pat. No. 2,870,119, col. 1, lines 27–53 and U.S. Pat. No. 3,126,400, col. 1, lines 21–61. Other patents exemplifying these organotin sulfur-containing compounds include U.S. Pat. Nos. 3,069,447; 3,478,071; 2,998,441; 2,809,956; 3,293,273; 3,396,185; 3,485,794; 2,830,067; 2,855,417, and 3,646,081.

Other organotin sulfur-containing compounds which are within the scope of this invention are characterized by the following Formula III:

Formula III $$(RSnS_{1.5})_n$$

wherein R is defined as above, S is sulfur and n is an integral number from about 2 to about 1,000. These polymeric compounds are described in the patent literature, for example, at U.S. Pat. No. 3,021,302 at col. 1, line 60 to col. 2, line 17; U.S. Pat. No. 3,424,712 at col. 3, line 34 to col. 4, line 2; U. S. Pat. No. 3,424,717 at col. 3, line 13 to col. 4, line 21.

Specific reference is made to these patents at the referenced columns for more details. Other polymeric tin mercaptide type compounds having the R-Sn-S bonds characterizing the organotin sulfur-containing compounds suitable for use in this invention are exemplified in U.S. Pat. Nos. 2,809,956; 3,293,273; 3,396,185, 3,485,794, and 3,646,081, and these exemplifications are incorporated herein by reference.

Specific examples of organotin sulfur-containing compounds include dibutyltin bis (isooctylthioglycolate), dimethyltin (isooctylthioglycolate), dioctyltin (isooctylthioglycolate), monomethyltin tris (isooctylthioglycolate), monobutyltin tris (isooctylthioglycolate), dibutyltin dilaurylmercaptide, butyl thiostannoic acid and dibutyltin bis (isooctyl-beta-mercaptopropionate).

Of course, it is obvious that organotin mercaptides, organotin mercapto acids, organotin mercaptoacid esters, etc., per se form no part of this invention and the mentioned patents and their specific disclosures clearly teach these compounds and their method of production to enable anyone of ordinary skill to use them in carrying out this invention.

B. Antimony Organic Sulfur-Containing Compound

The antimony organic sulfur-containing compounds which are of use in this invention are generally characterized as having the Sb - S group or linkage. Generally, most antimony organic compounds suitable for use in this invention are derived from trivalent antimony and include mercaptides which may be characterized by the following Formula IV:

Formula IV $$Sb(SR)_3$$

wherein R represents hydrocarbon or substituted hydrocarbon radicals such as those selected from the group consisting of alkyl, aryl or aralkyl. Examples of such groups are alkyls such as ethyl, propyl, butyl, octyl, nonyl, lauryl and octadecyl; aryls and aralkyls such as phenyl, benzyl, naphthyl, xylyl or phenyl ethyl and the like. The group SR of Formula I, for instance, may be the rest of a mercaptan or mercapto alcohol. As indicated, aliphatic and aromatic mercaptans may be employed to form the group SR. In the case of aliphatic mercaptans, those having 8 to 18 carbon atoms, e.g., decyl or dodecyl mercaptan are usually preferred because the lower mercaptans are unsuitable for the preparation and use of the stabilizers on account of their offensive smell. Suitable aromatic mercaptans are, for instance, thionaphthol, thiobenzyl alcohol, phenoxyethyl mercaptan, and others. As examples of suitable mercapto alcohols, monothioethylene glycol, monothiopropylene glycol, thioglycerol, thiodiethylene glycol, and others may be mentioned. Specific examples of such antimony mercaptides are antimony trilaurylmercaptide, antimony triphenylmercaptide and antimony tribenzylmercaptide. Patents exemplifying this formula Sb(SR)₃ or a similar formula and a definition of compounds represented thereby include U.S. Pat. Nos. 2,684,956 and 3,466,261, among others.

Antimony organic sulfur-containing compounds other than the antimony mercaptides of the Formula IV above, are suitable for use according to this invention. Such compounds are generally termed antimony mercaptoacid esters which may be further defined by the following formula:

Formula V $$Sb(SRCOOR')_3$$

wherein R is selected from the group consisting of alkylene, arylene, and aralkylene radicals and R' is a substituted or unsubstituted alkyl, aryl or mixed aryl-alkyl group. Thus R may be derived from mercapto acetic, β-mercaptopropionic, thiomalic, thiosalicyclic acids, etc. Similarly, R' may be derived from decanols, glycerol, glycol, monoesters, dihydroabietyl alcohol, phenoxyethanol, etc. Particularly suitable are the esters of mercapto alcohols, such as thioglycols, in which the hydroxy groups are esterified by an aliphatic, aromatic, or alicyclic saturated or unsaturated monocarboxylic acid. Readily available mercaptoacid esters are the esters of thioglycolic acid, such as ethyl thioglycolate, isooctylthioglycolate, and generally the esters of mono and dibasic aliphatic and aromatic acid mercaptides, such as esters of beta mercaptopropionic acid, mercaptolactic acid, mercaptobutyric acid and mercaptolauric acid. Specific examples of antimony mercaptoacid esters include antimony tris (isooctylthioglycolate), antimony tris (ethyleneglycoldimercaptoacetate), antimony tris (dodecylthioglycolate), antimony monododecylmercapto bis (isooctylthioglycolate), and antimony tris (isooctyl-β-mercaptopropionate). Patents exemplifying Formula V or a similar formula and a definition of compounds represented thereby include U.S. Pat. Nos. 2,680,726 and 3,530,158 among others.

The antimony organic sulfur-containing compounds having the SbS group represented by Formulas IV and V come within the scope of a broader characterization illustrated by the following formula:

Formula VI $$Y_nSbX_{3-n}$$

wherein Y may be hydrocarbon or substituted hydrocarbon radicals selected from the group consisting of alkyl, alkyloxy, alkenyl, alkynyl, aryl, alkaryl, aryloxy, alkaryloxy, acyloxy, cycloalkyl, and cycloalkenyl, X is selected from the group consisting of sulfide or mercaptide and n is an integer of 0 to 2. It will be understood that the SR and SRCOOR' groups of Formulas IV and V, and examples thereof, apply to X of Formula VI. Where Y is represented by the hydrocarbon or substituted hydrocarbon radical R, the compounds may be designated by the formula $R_nSbX_{3-n}$; and compounds which may thus be used in practice of this invention include those where R may be alkyl, cycloalkyl, alkenyl, cycloalkenyl, alkynl, or aryl including such groups when inertly substituted. When R is alkyl, it may include methyl, ethyl, n-propyl, i-propyl, n-butyl, i-butyl, n-amyl, n-octyl, 2-ethylhexyl, etc. as well as substituted alkyls including phenylethyl, benzyl, etc. Typical alkenyl groups which may be employed may include vinyl, 2-propenyl (i.e., allyl), 1-propenyl, 1-butenyl, 2-butenyl, etc. as well as inertly substituted alkenyl groups typified by 4-phenyl, buten-1-yl, etc. Typical cycloalkyl groups may include cyclohexyl, cycloheptyl, cyclooctyl as well as inertly substituted cycloalkyl groups including 2-methyl cycloheptyl, 3-butyl cyclohexyl, 3-methylcyclohexyl, etc. Typical alkynyl groups which may be employed include propyn-1-yl, propyn-2-yl, butyn-1-yl, phenylethynyl, ethynyl, etc. Typical aryl groups which may be employed may include phenyl, tolyl, xylyl, chlorophenyl, dimethylaminophenyl, etc. Where more than one Y, R or X group is present in Formula VI or the $R_nSbX_{3-n}$ formula mentioned above such groups may be the same or different. Typical mercaptides include phenyl mercaptide, lauryl mercaptide, butyl mercaptide, etc. Specific compounds when n is 1 or 2 include n-butyl antimony dilaurylmercaptide, n-butyl antimony sulfide, di-n-butyl antimony lauryl mercaptide, diphenyl antimony lauryl mercaptide, ditolyl antimony n-amyl mercaptide, dibenzyl antimony benzyl mercaptide, diallyl antimony cyclohexyl mercaptide, diphenyl antimony allylmercaptide, dicyclohexyl antimony n-hexyl mercaptide, ditolyl antimony phenyl mercaptide, di-isopropyl antimony 2-ethylhexyl mercaptide, di-p-chlorophenyl antimony n-butyl mercaptide, diphenyl antimony ethyl mercaptoacetate. Patents exemplifying such antimony compounds include U.S. Pat. Nos. 3,530,158 and 3,399,220. Where the Y group is aryloxy, alkyloxy, alkaryloxy, acyloxy, etc., specific examples from which this group is derived may include 2-ethylhexanol, phenol, nonylphenol, xylenol, 2-ethylhexoic acid, oleic acid, lauric acid, benzoic acid and the like. Of course, it is apparent that antimony mercaptides, antimony mercapto acids, antimony mercaptoacid esters, etc., per se form no part of this invention and the mentioned patents and their specific disclosures clearly teach these compounds or similar compounds and their methods of production to enable anyone of ordinary skill to use them in carrying out this invention.

TRI-ALKALI METAL PHOSPHATE

The tri-alkali metal phosphates, for example, trisodium phosphate, tripotassium and trilithium phosphate may be used in this invention. The trisodium and tripotassium phosphates have been found to provide unexpected heat stabilizing synergisms in the combinations of this invention. Further, the trisodium phosphate is presently preferred over the tripotassium phosphate because of its more pronounced synergism with the organometalic components. The trisodium phosphates are also more commercially available. In contrast, as mentioned above and demonstrated by tests reported hereinafter, other seemingly similar alkali metal phosphates have been found by me not to provide heat stabilizing synergism in combination with organometalic sulfur-containing components. The tri-alkali metal phosphates are common chemicals and their methods of preparation are well known. Physical and chemical properties of these tri-alkali metal phosphates and their methods of manufacture are disclosed in *Encyclopedia of Chemical Technology*, 2d. Ed., Vol. 15, pp 232–267.

The tri-alkali metal phosphates are salts and such salts may be employed in this invention in various forms including an anhydrated, hydrated, or alkaline salt form. For example, in the case of trisodium phosphate, i.e., $Na_3PO_4$, the anhydrous form has been demonstrated to provide synergistic long term heat stability results in the combination of this invention. Hydrates of trisodium phosphate exemplified by $Na_3PO_4 \cdot ca\ 12H_2O$ have been found to behave in a similar manner and further provide improvement in delaying the development of early color. The term "early color" is understood in the art to apply to the first noticeable yellowing or slight yellowing of vinyl halide resin formulations under the action of heat. Therefore, where improved early color is also desirable, the hydrated trialkali metal phosphates are presently preferred over the anhydrous salts. Crystalline trisodium phosphate in commerce may contain excess sodium hydroxide. Its composition has not been unequivocally settled according to reported information, see p. 238 of the above *Encyclopedia of Chemical Technology*. These crystalline materials are hypothesized to be alkaline salts or mixed alkaline salts represented by the formulas $Na_3PO_4.ca\ 12H_2O.ca\ 1/4NaOH$ and $Na_3PO_4.ca\ 12H_2O.ca\ 1/7\ NaOH$. These crystalline or alkaline salts have also been proved to function in a synergistic manner according to the principles of this invention. Present long term heat data shows that an amount of sodium hydroxide in the alkaline salt form will out-perform an equivalent amount of free sodium hydroxide alone with an organotin component when added to the vinyl halide resin compositions. Improvement in early color has also been found with these alkaline salts. However, with or without excess alkalinity either in the mixed salt or free form, or in hydrated or anhydrous form, tri-alkali metal phosphates have been found to synergistically extend the long term heat stability in the combination of this invention. Therefore, it is to be expressly understood that the term tri-alkali metal phosphate herein in its broadest sense includes the hydrated, anhydrated, or alkaline or mixed salt form. Each form has been demonstrated to provide long term heat stability synergisms with the organotin or antimony organic sulfur-containing compounds. Where even further improvement in early color is desired, quite unexpectedly, the hydrated salts or alkaline salts are preferred in the combinations of this invention.

The principles of this invention and its operating parameters will be further understood with reference to the following detailed examples which serve to illustrate the types of specific materials and their amounts as used in typical vinyl halide resin formulations and the synergisms displayed by the essential combination of components in the stabilizer composition according to this invention. These examples are considered to be exemplary of this invention, and should not be considered as limiting, especially in view of applicant's broad disclosure of principles of this invention.

In the examples which follow, a standard resin formula was employed which contained 200 parts by weight of polyvinyl chloride homopolymer which is characterized as a white powder having a particle size such that 100 percent passes through a 42 mesh screen at a specific gravity of 1.40 (Geon 103 EP by B. F. Goodrich). Included in the standard resin formula is also 6 parts by weight of a processing aid which is an acrylic polymer in powdered form which improves the hot processing of rigid and plasticized vinyl compounds (Acryloid K120N by Rohm and Haas Company). This material is a fine, white free flowing powder having a bulk density at about 0.30 grams per cc and a viscosity, 10 percent toluene, at 600 cps (Brookfield). The processing aid merely facilitates hot processing and forms no part of this invention. A paraffin wax lubricant, i.e., a commercial wax designated 165 (H. M. Royal, Inc.) was also employed at 2 parts by weight in the resin formula. The term "standard resin blank" or just "blank" is used hereinafter to designate the standard resin formula without heat stabilizer additives. Various combinations of the organotin or antimony organic sulfur-containing compounds and tri-alkali metal phosphate were mixed into the standard resin formula according to the following examples on a parts by weight basis. All amounts of such stabilizer components, in the tables and examples unless otherwise indicated, are on a parts per hundred resin basis, or as indicated above, simply "phr." The blank resin formula with and without stabilizer additives is tested in the following examples by first milling for 5 minutes at 350°F to form a uniform polyvinylchloride composition, after which time long term heat stabilities of test samples were determined by oven treatment at 375°F as indicated. The heat stability contribution of the stabilizer compositions (or components thereof) hereinafter are determined by ascertaining the number of minutes at the test temperature required for the samples to degrade by severe darkening to a dark red or black. Thus, the term "heat stability contribution" is used to indicate the amount of heat stability in minutes contributed by a composition or component to the resin blank formula.

EXAMPLES 1 – 9

Examples 1 – 9 demonstrated the synergistic combination of an organotin sulfur-containing compound and trisodium phosphate. For this purpose, anhydrous trisodium phosphate, $Na_3PO_4$, was tested alone, and at various levels in the range of 0.5 – 5 phr with dibutyltin bis (isooctylthioglycolate), i.e., "DBT," at various levels in the range of about 0.25 – 1 phr. Also, DBT was tested alone at 0.25, 0.5 and 1 phr. Unless otherwise specified, in these examples and other examples which follow, the tri-alkali metal salts are in the anhydrous form. The standard resin blank formula was prepared as above and the contributions of the stabilizer components alone and in combination were determined by milling of all samples in the series for 5 minutes at 350°F, after which 375°F oven heat stability tests were performed. The contributions of the trisodium phosphate alone, DBT alone and various combinations of the two components to the heat stability of the standard resin blank are reported in Table I.

TABLE I

| | Components | | 375° F Heat Stability Contribution |
|---|---|---|---|
| Example 1 | 0.5 | trisodium phosphate | 0' |
| Example 2 | 2.0 | trisodium phosphate | 0' |
| Example 3 | 5.0 | trisodium phosphate | 0' |
| Example 4 | 0.25 | DBT | 10' |
| Example 5 | 0.5 | DBT | 20' |
| Example 6 | 1.0 | DBT | 40' |
| Example 7 | 0.25 | DBT | |
| | 5.0 | trisodium phosphate | 35–40' |
| Example 8 | 0.5 | DBT | |
| | 2.0 | trisodium phosphate | 40–45' |
| Example 9 | 1.0 | DBT | |
| | 0.25 | trisodium phosphate | 50' |

Referring to Table I, trisodium phosphate contributed synergistically with an organotin sulfur-containing compound as a stabilizer for vinyl halide resins. Examples 1 – 3 demonstrated that trisodium phosphate alone at levels of either 0.5, 2.0 or 5.0 phr made no material contribution to the standard resin blank. On the other hand, the DBT alone at 0.25, 0.5 and 1 phr respectively, contributed 10 minutes, 20 minutes and 40 minutes of heat stability to the resin blank under conditions of tests (See Examples 6 – 9). However, combinations of the organotin compound at levels of about 0.25 – 1.0 phr with trisodium phosphate at levels of about 5.0 – 0.5 phr synergistically enhanced the heat stability of the resin. Furthermore, even with decreasing levels of the organotin from 1 phr to 0.25 phr, with increasing amounts of the otherwise ineffective trisodium phosphate from 0.5 to 5.0 phr, long term heat stability results were still achieved. A comparison of Examples 1 – 3, 4 – 6 and 7 – 9 demonstrates the unexpected contribution of the combination of components in accord with the principles of this invention.

EXAMPLES 10 – 16

In a manner similar to Examples 1 – 9, antimony organic sulfur-containing compounds were employed in combination with trisodium phosphate for the purpose of demonstrating their synergistic behaviors. The standard resin formula with and without stabilizer components was prepared as above and heat stability tests were performed for antimony tris (isooctylthioglycolate), i.e., "ATG"; antimony tris (isooctyl-β-mercaptopropionate), i.e., "ATP"; and antimony tris (laurylmercaptide), i.e., "ATL" with trisodium phosphate. All samples were milled at about 350°F with 375°F oven heat stability testing as above. The results are reported in Table II.

TABLE II

| | | Components | 375° F Heat Stability Contribution |
|---|---|---|---|
| Example 10 | 2.0 | trisodium phosphate | 0' |
| Example 11 | 0.5 | ATG | 25' |
| Example 12 | 2.0 | trisodium phosphate | 45' |
| | 0.5 | ATG | |
| Example 13 | 0.5 | ATP | 20' |
| Example 14 | 2.0 | trisodium phosphate | 35' |
| | 0.5 | ATP | |
| Example 15 | 0.5 | ATL | 20' |
| Example 16 | 2.0 | trisodium phosphate | 30' |
| | 0.5 | ATL | |

Examples 10–16 of Table II demonstrated the synergistic combinations of various antimony organic sulfur-containing compounds. By comparison, the combination of trisodium phosphate with ATG, ATP or ATL far outperformed, respectively, the sum of the individual components in the same amounts. Referring to Examples 10–12, the ATG contribution of 25 minutes was far exceeded by the 45 minute contribution of the combination of trisodium phosphate and ATG. Referring to Examples 10 and 13–14, the ATP contribution of 20 minutes was far exceeded by the 35 minute contribution of the combination of trisodium phosphate and ATP. Similarly, referring to Examples 10 and 15–16, the 30 minutes contribution of the combination of trisodium phosphate and ATL exceed the ATL contribution of 20 minutes. Accordingly, the principles of this invention apply to both organotin and antimony organic sulfur-containing compounds.

EXAMPLES 17 – 21

To further illustrate the principles of this invention employing other organotin sulfur-containing compounds and trisodium phosphate and the synergistic effects achieved by such combinations, Examples 17–21 were performed. In these examples, monobutyltin tris (isooctylthioglycolate) was substituted for the dibutyltin bis (isooctylthioglycolate) of the previous examples. Hereinafter, the monobutyltin tris isooctylthioglycolate is designated "MBT." Milling and oven testing for heat stability was performed as above. In Examples 17 – 18, the effects of trisodium phosphate in the amounts of 0.1 and 10 phr alone were observed upon the standard resin blank. In Examples 19 – 20, combinations of the MBT and trisodium phosphate were tested. Example 21 employed MBT alone. The results are reported in Table III.

TABLE III

| | | Components | 375° F Heat Stability Contribution |
|---|---|---|---|
| Example 17 | 0.1 | trisodium phosphate | 0' |
| Example 18 | 10 | trisodium phosphate | 0' |
| Example 19 | 0.5 | MBT | |
| | 0.25 | trisodium phosphate | 40' |
| Example 20 | 0.5 | MBT | |
| | 1.0 | trisodium phosphate | 70' |
| Example 21 | 0.5 | MBT | 30' |

Examples 17–21 of Table III demonstrated that the advantages of this invention can be secured with other organotin components. For example, while trisodium phosphate at levels of 0.1 and 10 phr did not materially contribute any heat stabilizing effectiveness to the blank, 0.5 part alone of MBT contributed about 30 minutes of heat stability (comparing Examples 17–18 and 21). However, when 0.5 phr of MBT was employed in combination with 0.25 of trisodium phosphate, a heat stability contribution of 40 minutes was observed (Example 19). Therefore, as illustrated by Example 19, instead of the expected heat stability of 30 minutes, allowing for the contribution of the MBT and no contribution by the trisodium phosphate alone, a synergistic 40 minutes was achieved. Similarly, 0.5 phr MBT and 1.0 phr trisodium phosphate of Example 20 produced a synergistic stabilization of 70 minutes in contrast to the expected 30 minutes.

EXAMPLES 22 – 25

The effect of anhydrous tripotassium phosphate was observed in combination with an organotin sulfur-containing compound (DBT) for comparison with trisodium phosphate. In Example 22, 1 phr trisodium phosphate was employed alone in the standard blank formula and, in Example 23, 0.5 phr of the dibutyltin bis (isooctylthioglycolate) was also employed alone in the standard blank formula. For comparison, the combination of 1 phr tripotassium phosphate and 0.5 phr DBT was employed in Example 24. In Example 25, 1 phr trisodium phosphate was substituted for the tripotassium phosphate of Example 24. Milling and oven testing for heat stability were performed as above. The results are reported in Table IV.

TABLE IV

| | | Components | 375° F Heat Stability Contribution |
|---|---|---|---|
| Example 22 | 1.0 | tripotassium phosphate | 0' |
| Example 23 | 0.5 | DBT | 20' |
| Example 24 | 0.5 | DBT | |
| | 1.0 | tripotassium phosphate | 35' |
| Example 25 | 0.5 | DBT | |
| | 1.0 | trisodium phosphate | 40' |

Examples 22 – 25 of Table IV demonstrated that the advantages of this invention can be secured with tripotassium phosphate. For example, while tripotassium phosphate alone at 1 phr did not materially contribute any heat stabilizing effectiveness to the blank, 0.5 part alone of DBT contributed about 20 minutes of heat stability (comparing Examples 22 – 23). However, when 0.5 phr of DBT was employed in combination with 1 phr of tripotassium phosphate, a heat stability contribution of about 35 minutes was observed (Example 24). Therefore, as illustrated by Example 24, a synergistic contribution of 35 minutes was achieved. In comparison, 0.5 phr DBT and 1.0 phr trisodium phosphate of Example 25 produced a synergistic stabilization of about 40 minutes. These examples also show that it is presently preferred to use the trisodium phosphate as the tri-alkali metal phosphate in combination with an organotin sulfur-containing compound.

EXAMPLES 26 – 28

The procedures of Examples 23 – 25 were repeated except that 0.5 phr of antimony tris (isooctylthioglycolate), i.e., ATG, was substituted for the dibutyltin bis (isooctylthiocolate), i.e., DBT. The results are reported in Table V.

TABLE V

| | | Components | 375° F Heat Stability Contribution |
|---|---|---|---|
| Example 26 | 0.5 | ATG | 25' |
| Example 27 | 0.5 | ATG | |
| | 1.0 | tripotassium phosphate | 35' |
| Example 28 | 0.5 | ATG | |
| | 1.0 | trisodium phosphate | 40 – 45' |

Examples 26 – 28 demonstrated the tripotassium phosphate synergism with an antimony organic sulfur-containing compound and, further, the better performance of trisodium phosphate with the antimony compound.

COMPARATIVE TESTS

For the purpose of further demonstrating the unexpected behavior of trisodium phosphate in the stabilizer combinations of this invention, a series of comparative Tests 1–7 were made. The standard blank formula was prepared with the addition of 0.5 phr DBT alone (Test 1). Then, the effect of 1.5 phr of trisodium phosphate on the blank formula in combination with DBT was observed (Test 2). For comparison, 1.5 phr trisodium phosphate $Na_3PO_4$, was substituted by 1.5 phr each of disodium monohydrogen phosphate, $Na_2HPO_4$; monosodium dihydrogen phosphate monohydrate, $NaH_2PO_4 \cdot H_2O$; sodium hexametaphosphate, $(NaPO_3)_x$; sodium pyrophosphate $Na_4P_2O_7$; and pentasodium tripolyphosphate $Na_5P_3O_{10}$; (Tests 3–7). All of these phosphates were anhydrated except for $NaH_2PO_4 \cdot H_2O$. Upon milling for 5 minutes at 350°F and oven testing at 375°F with observations of test samples at five minute intervals the results are reported as follows:

COMPARATIVE TEST TABLE

| | | Components | 375° F Heat Stability Contribution |
|---|---|---|---|
| Test 1 | 0.5 | DBT | 25' |
| Test 2 | 0.5 | DBT | |
| | 1.5 | trisodium phosphate | 40' |
| Test 3 | 0.5 | DBT | |
| | 1.5 | disodium monohydrogen phosphate | 25' |
| Test 4 | 0.5 | DBT | |
| | 1.5 | sodium dihydrogen phosphate monohydrate | 20' |
| Test 5 | 0.5 | DBT | |
| | 1.5 | sodium hexametaphosphate | 25' |
| Test 6 | 0.5 | DBT | |
| | 1.5 | sodium pyrophosphate | 25' |
| Test 7 | 0.5 | DBT | |
| | 1.5 | penta sodium tripolyphosphate | 25' |

Comparative Tests 1–7 demonstrate my discovery that trisodium phosphate, unlike seemingly similar alkali metal phosphates, performs synergistically in the heat stabilization of vinyl halide resins in combination with the organotin sulfur-containing compounds. In contrast, long term heat stability was not improved by other seemingly similar alkali metal phosphates as demonstrated by Tests 3–7 Furthermore, in comparison, the early color performance of trisodium phosphate (the time within which the test samples start to yellow under oven heat) was far superior to the other seemingly similar alkali metal phosphates under test. For example, Test sample 2 did not start to yellow until 25 minutes of oven heat, whereas, Test samples 1 and 3–7 all started to yellow at least by about 10–15 minutes oven testing.

Comparative Tests 1–7 were repeated employing the same procedures except that 0.5 phr of antimony tris (isooctylthioglycolate), i.e., "ATG," was substituted for DBT in each case and the amount of each of the sodium phosphates was reduced to 1 phr in each case. These further comparative tests showed that trisodium phosphate in combination with the antimony organic sulfur-containing compound performed synergistically in the heat stabilization of the vinyl halide resin with results of contribution similar to the results of Test 2 for the combination of trisodium phosphate and DBT. In contrast, and confirming Tests 3–7, the combination of ATG with other alkali metal phosphates did not improve long term heat stability.

EXAMPLES 29 – 35

In these examples, the tri-alkali metal phosphates in hydrated, anhydrated, or alkaline salt form were compared in combination with dibutyltin bis (isooctylthioglycolate), i.e., DBT. The salts used were anhydrous trisodium phosphate, $Na_3PO_4$, hydrated trisodium phosphate, $Na_3PO_4 \cdot ca\ 12H_2O$, and alkaline trisodium phosphate, Na₃PO₄.ca 12H₂O.ca 1/4NaOH. Milling and oven testing of each of the components alone and in combination with DBT in the standard resin formula. All samples were milled at about 350°F with 375°F oven stability testing as above. The results are reported in Table VI.

All forms of the trisodium phosphates synergistically behaved in combination with the organotin sulfur-containing compound as shown by Examples 29–35. The hydrated or alkaline salt forms contributed about 10 minutes more long term heat stability to the combination (Examples 34 and 35 compared with Example 33). Furthermore, while improved early color performance was observed for Examples 33–35, the early color performances of both the hydrated and alkaline salt forms of trisodium phosphate were superior in that significant yellowing did not occur until about 40 minutes of oven heat. Accordingly, when enhanced inhibition or minimization of early color development is desired in the stabilizer composition of this invention, the hydrated or alkaline salt forms of the tri-alkali metal phosphates may be used.

TABLE VI

| | | Components | 375° F Heat Stability Contribution |
|---|---|---|---|
| Example 29 | 0.5 | DBT | 20' |
| Example 30 | 1.5 | Na₃PO₄ | 0' |
| Example 31 | 1.5 | Na₃PO₄.ca 12H₂O | 0' |
| Example 32 | 1.5 | Na₃PO₄.ca 12H₂O.¼ NaOH | 0' |
| Example 33 | 0.5 | DBT | |
| | 1.5 | Na₃PO₄ | 40' |
| Example 34 | 0.5 | DBT | |
| | 1.5 | Na₃PO₄.ca 12H₂O | 50' |
| Example 35 | 0.5 | DBT | |
| | 1.5 | Na₃PO₄.ca 12H₂O.ca ¼ NaOH | 50' |

In each of the above examples, the vinyl halide resin which was employed is a homopolymer of vinyl chloride, i.e., polyvinyl chloride. It is to be understood, however, that this invention is not limited to a particular vinyl halide resin such as polyvinyl chloride. Other halogen-containing resins which are employed and illustrate the principles of this invention include chlorinated polyethylene, chlorinated polyvinyl chloride and the vinyl halide resin type. Vinyl halide resin, as understood herein, and as appreciated in the art, is a common term and is adopted to define those resins or polymers usually derived by polymerization or copolymerization of vinyl monomers including vinyl chloride with or without other comonomers such as ethylene, propylene, vinyl acetate, vinyl ethers, vinylidene chloride, methacrylate, styrene, etc. A simple case is the conversion of vinyl chloride H₂CHCl to polyvinyl chloride (CH₂—CHCl)ₙ wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymers, vinyl chloride-vinylidene copolymers, vinyl chloride-propylene copolymers; and the like. Of course, the vinyl halide commonly used in the industry is the chloride, although others such as bromide and fluoride may be used. Examples of the latter polymers include polyvinyl bromide, polyvinyl fluoride, and copolymers thereof.

While my invention brings the organotin and antimony organic sulfur-containing compounds together as a class principally because of their unique behaviors and unobvious properties with tri-alkali metal phosphates, it will be appreciated, in view of this description, that distinct advantages are associated with each of the members of this class in combination with a particular metal phosphate.

It is also to be understood that other components such as lubricants, processing aids, plasticizers, fillers, pigments, other stabilizers, other non-halogenated resins, etc., can be incorporated in the resin compositions and the benefits of this invention can be achieved. Accordingly, other modifications will become apparent in view of the teachings herein without departing from the true spirit and scope of this invention.

What is claimed is:

1. A vinyl halide resin heat stabilizer composition which consists essentially of,
   a tri-alkali metal phosphate, and
   a compound selected from the group consisting of an organotin sulfur-containing compound having a

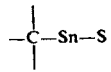

group and an antimony organic sulfur-containing compound having a Sb-S group, and mixtures thereof, said compound and metal phosphate components in relative amounts which together provide a synergistic heat stabilizing effectiveness upon said resin.

2. The composition of claim 1 wherein said organotin sulfur-containing compound is selected from the group consisting of an organotin mercaptide, organotin mercaptoacid, organotin mercaptoacid ester, organotin sulfide, and organo thiostannoic acid, and mixtures thereof.

3. The composition of claim 1 wherein said antimony compound is selected from the group consisting of an antimony mercaptide, antimony mercaptoacid and antimony mercaptoacid ester, and mixtures thereof.

4. The composition of claim 1 wherein said phosphate is selected from the group consisting of trisodium phosphate, trilithium phosphate and tripotassium phosphate, and mixtures thereof.

5. The composition of claim 2 wherein said components are present in a weight ratio in the range of about 0.1 – 5 of the organotin compound to about 0.1 – 10 of the metal phosphate.

6. The composition of claim 3 wherein said components are present in a weight ratio in the range of about 0.1 – 3 of the antimony compound to about 0.1 – 10 of the metal phosphate.

7. A vinyl halide resin composition which comprises a vinyl halide resin and, as a heat stabilizer, an effective amount of a composition consisting essentially of,
   a tri-alkali metal phosphate, and
   a compound selected from the group consisting of an organotin sulfur-containing compound having a

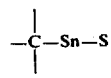

group and an antimony organic sulfur-containing compound having a Sb-S group, and mixtures thereof, said compound and metal phosphate components in relative amounts which together provide a synergistic heat stabilizing effectiveness upon said resin.

8. The composition of claim 7 wherein said organotin sulfur-containing compound is selected from the group consisting of an organotin mercaptide, organotin mercaptoacid, organotin mercaptoacid ester, organotin sulfide, and organo thiostannoic acid, and mixtures thereof.

9. The composition of claim 7 wherein said antimony compound is selected from the group consisting of an antimony mercaptide, antimony mercaptoacid and antimony mercaptoacid ester, and mixtures thereof.

10. The composition of claim 7 wherein said phosphate is selected from the group consisting of trisodium phosphate, trilithium phosphate and tripotassium phosphate, and mixtures thereof.

11. The composition of claim 7 wherein said phosphate is a hydrated salt.

12. The composition of claim 7 wherein said phosphate is an alkaline salt.

13. The composition of claim 7 wherein said vinyl halide resin is vinyl chloride-containing resin.

14. The composition of claim 7 wherein said effective amount is on the order of about 0.2 to about 10 parts by weight per 100 parts resin.

15. The composition of claim 8 wherein the relative amount of said organotin compound is in the range of about 0.1 to about 5 parts by weight per 100 parts resin and the relative amount of said phosphate present is in the range of about 0.1 to about 10 parts by weight per 100 parts resin.

16. The composition of claim 9 wherein the relative amount of said antimony compound is about 0.1 to about 3 parts by weight per 100 parts resin and the relative amount of said phosphate present is about 0.1 to about 10 parts by weight per 100 parts resin.

17. A vinyl halide resin composition which comprises a vinyl chloride-containing resin and, as a heat stabilizer, an effective amount of a composition consisting essentially of, a tri-alkali metal phosphate, and a compound selected from the group consisting of dibutyltin bis (isooctylthioglycolate), dimethyltin (isooctylthioglycolate), dioctyltin (isooctylthioglycolate), monomethyltin tris (isooctylthioglycolate), monobutyltin tris (isooctylthioglycolate), dibutyltin dilaurylmercaptide, butyl thiostannoic acid, dibutyltin bis (isooctyl-beta-mercapto-propionate), antimony tris (isooctylthioglycolate), antimony tris (laurylmercaptide), antimony tris (isooctylmercaptopropionate), antimony monododecylmercapto bis (isooctylthioglycolate), antimony tris (ethyleneglycoldimercaptoacetate), and antimony tris (dodecylthioglycolate), and mixtures thereof, said compound and metal phosphate components in relative amounts which together provide a synergistic heat stabilizing effectiveness upon said resin.

18. The composition of claim 17 wherein said phosphate is trisodium phosphate.

19. The composition of claim 18 wherein said resin is polyvinyl chloride.

20. The composition of claim 19 wherein said effective amount is on the order of about 0.2 to about 10 parts by weight per 100 parts resin.

21. The composition of claim 17 wherein the relative amount of said compound is present up to about 5 parts by weight per 100 parts resin and the relative amount of metal phosphate present is in the range of about 0.1 to about 10 parts by weight per 100 parts resin.

22. The composition of claim 18 wherein said trisodium phosphate is a hydrated salt.

23. The composition of claim 18 wherein said trisodium phosphate is an alkaline salt.

* * * * *

UNITED STATES PATENT AND TRADEMARK OFFICE
CERTIFICATE OF CORRECTION

PATENT NO. : 3,919,168
DATED : November 11, 1975
INVENTOR(S) : Dale J. Dieckmann It is certified that error appears in the above-identified patent and that said Letters Patent are hereby corrected as shown below:

Col. 1, line 39  "3,446,261" should be --3,466,261--

Col. 15, line 36  "NaOH" should appear before the line which denotes the end of Table VI Col. 15, line 55  "$H_2CHCl$" should be -- $H_2C=CHCl$ --

Col. 15, line 56  "$(CH_2-CHCl_n$" should be --$(CH_2-CHCl-)_n$--

$$\text{Signed and Sealed this}$$

ninth Day of March 1976

[SEAL]

Attest:

RUTH C. MASON
*Attesting Officer*

C. MARSHALL DANN
*Commissioner of Patents and Trademarks*